June 3, 1930.   J. F. O'CONNOR   1,762,096
FRICTION SHOCK ABSORBING MECHANISM
Filed June 25, 1923   2 Sheets-Sheet 2
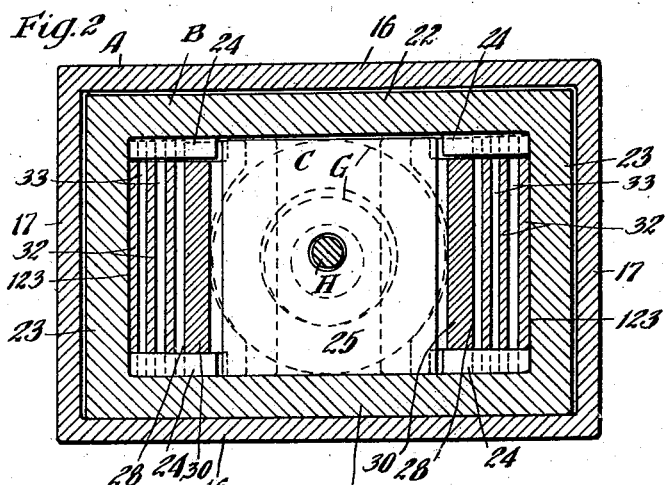
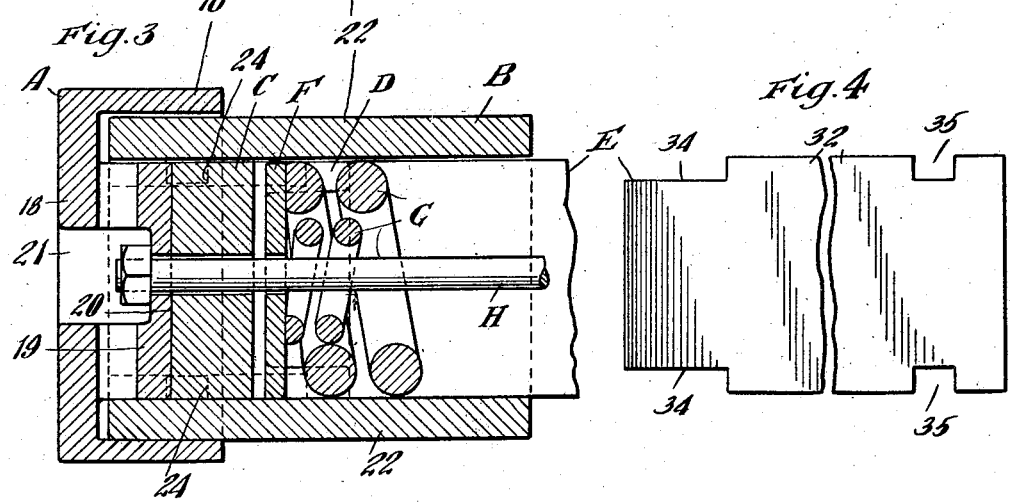
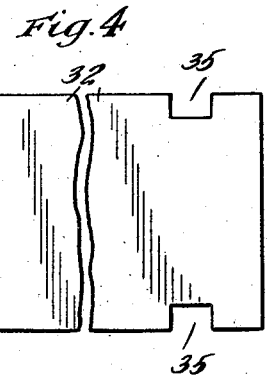
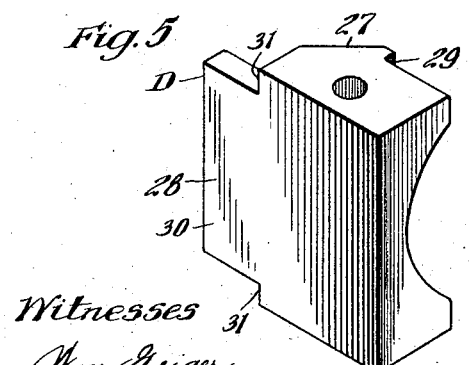
Inventor
John F. O'Connor
By George J. Haight
His Atty.

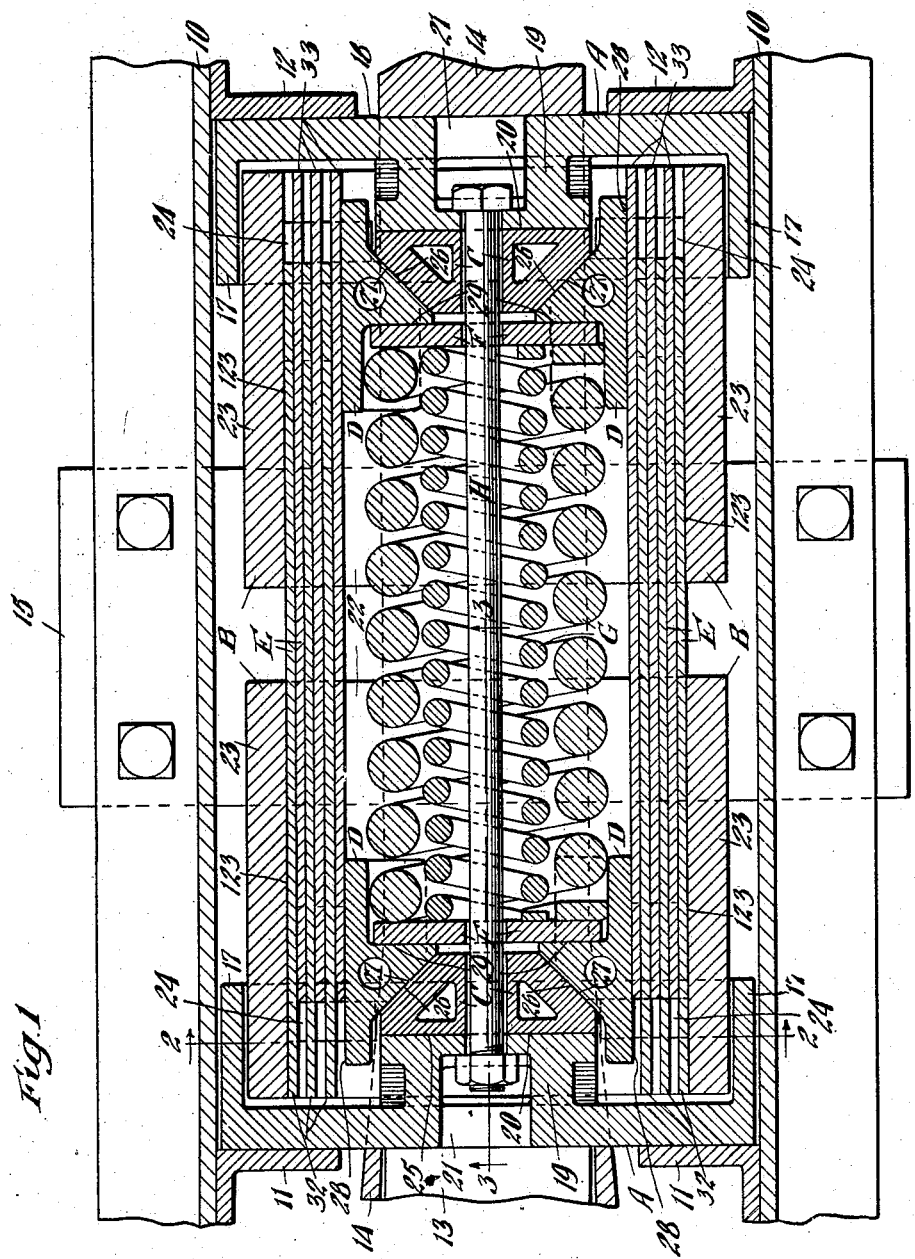

Patented June 3, 1930

1,762,096

UNITED STATES PATENT OFFICE

JOHN F. O'CONNOR, OF CHICAGO, ILLINOIS, ASSIGNOR, BY MESNE ASSIGNMENTS, TO W. H. MINER, INC., A CORPORATION OF DELAWARE

FRICTION SHOCK-ABSORBING MECHANISM

Application filed June 25, 1923. Serial No. 647,434.

This invention relates to improvements in friction shock absorbing mechanisms.

One object of the invention is to provide a friction shock absorbing mechanism, more particularly adapted for railway draft riggings, wherein is obtained high capacity due to large frictional areas, together with preliminary action of the followers and wedge devices prior to actual relative movement of the friction plates, to permit easy release of the parts when the actuating force is removed.

Another object of the invention is to provide a friction shock absorbing mechanism of the intercalated friction plate type, wherein the wedge pressure creating means is released, and has an initial movement, independently of the friction plates to assure quick and certain release of the entire mechanism.

A more specific object of the invention is to provide a mechanism of the type referred to, including a plurality of relatively movable friction plates co-acting with a pair of friction casings or housings, together with wedge shoes and wedge pressure creating means, wherein the plates are returned to normal position by means on the housings engaging the same, and the housings in turn are restored to normal position by engagement of the shoes therewith, the shoes being so arranged and disposed with reference to the housings that the engaging means on the shoes and housings are spaced apart during compression of the mechanism, whereby, independent initial release movement of the shoes is had with reference to the housings and plates.

In the drawings forming a part of this specification Fig. 1 is a horizontal, longitudinal, sectional view of a railway draft rigging, showing my improvements in connection therewith. Fig. 2 is a vertical, transverse, sectional view, corresponding substantially to the line 2—2 of Fig. 1. Fig. 3 is a vertical, longitudinal, sectional view corresponding substantially to the line 3—3 of Fig. 1. Fig. 4 is a detailed, side elevational view of one of the friction plates used in connection with my improved shock absorbing mechanism, the plate being shown partly broken to better accommodate the view to the sheet. And Fig. 5 is a detailed, perspective view of one of the friction shoes.

In said drawings, 10—10 indicate channel shaped center or draft sills, to the inner faces of which are secured front stop lugs 11 and rear stop lugs 12. A portion of the draw-bar is shown at 13, to which is attached a hooded yoke 14. The shock absorbing mechanism proper, including the front and rear followers, are disposed within the yoke 14 and the movable parts of the draft rigging are supported by a detachable saddle plate 15.

The improved shock absorbing mechanism, as shown, comprises, broadly, front and rear followers A—A; front and rear friction casings or housings B—B; front and rear wedge blocks C—C; front and rear pairs of wedge shoes D—D; two groups of friction plates E—E; front and rear spring followers F—F; a spring resistance G; and a retainer bolt H.

The front and rear followers A are of like construction, each being provided with top and bottom walls 16—16, side walls 17—17 and a transversely disposed end wall 18. The top, bottom and side walls of the followers are relatively short, as clearly shown in Figure 1, and the end walls are adapted to co-act with the front and rear stop lugs in the usual manner. The end walls 18 are provided each with an inwardly extending hollow projection 19 spaced from the top, bottom and side walls of the follower, being of a height to extend loosely into the corresponding casing B and work between the top and bottom walls thereof. Each projection 19 is provided with a flat end face 20 adapted to form an abutment for the corresponding wedge block C. Each of the end walls is also provided with a central opening 21 through which the retainer bolt or nut may be inserted.

The friction casings or housings B are of like construction, being of rectangular cross-section and open at the opposite ends. Each of the casings has spaced, longitudinally disposed, top and bottom walls 22—22 and longitudinally extending, spaced, side walls 23—23, the inner sides of the walls 23 forming longitudinally extending friction surfaces 123 adapted to co-act with the outermost plates of the groups of friction plates. Near their outer ends, the upper and lower walls of each casing are provided with transversely disposed, alined pairs of upper and lower ribs 24, extending inwardly from the side walls for a short distance and having their inner ends spaced apart, as clearly shown in Fig. 2, to accommodate the corresponding wedge block C therebetween.

The front and rear wedge blocks C are of like construction, each block being of such a height as to be loosely accommodated between the upper and lower walls of the corresponding casing B, and having a flat outer face 25 adapted to abut the face 20 of one of the follower projections 19, and a pair of faces 26 at the opposite end thereof converging inwardly and adapted to co-act with the adjacent pair of friction wedge shoes D.

The friction wedge shoes D are four in number, arranged in pairs at opposite ends of the mechanism, each pair co-acting with the corresponding wedge block C. Each of the wedge shoes D is provided with a wedge face 27 adapted to co-act with one of the wedge faces 26 of one of the blocks C, an outer elongated flat friction face 28 adapted to co-act with the innermost friction plate of one of the groups E, and a rear face 29 forming an abutment for one of the spring followers F. As clearly shown in Fig. 5, each of the shoes D is in the form of elongated member, cut away at its inner side to provide a concave surface rearwardly of the face 29 to receive the side of the outer coil of the spring resistance G. The outer end of each of the shoes D is reduced in height as indicated at 30 thereby providing upper and lower stop shoulders 31—31 adapted to co-act with the upper and lower ribs 24 of the casings B, to effect restoration of the casings to normal position.

The friction plates E are arranged within the casings B and comprise two oppositely disposed groups. As herein shown, the groups of plates E each comprises three plates 32 and three plates 33, the plates 32 and 33 being alternated and the plates 32 of each group arranged outermost and in contact with the inner surfaces 123 of the walls 23 of the casings B, and with a plate 33 of each group arranged innermost and in contact with the faces 28 of the adjacent front and rear wedge shoes D. The plates 32 and 33 are of similar construction, and as best shown in Fig. 4, each plate has the upper and lower edges cut away at one end thereof to provide a reduced portion 34 adapted to work between the upper and lower ribs 24 of one of the casings B. Near the opposite end, each plate has the upper and lower edges recessed as indicated at 35, the recesses 35 being in vertical alinement and adapted to receive the upper and lower ribs 24 of the other follower casing B. The plates 32 and 33 are thus anchored to the front and rear casings B respectively, for movement therewith, the plates 32 and 33 being reversely arranged and having the ends thereof which are fixed respectively to the front and rear casings B flushed to the outer ends of the respective casings.

The spring resistance G extends longitudinally of the mechanism and is interposed between the front and rear pairs of shoes, having the front and rear ends thereof bearing directly on the spring followers F.

The mechanism is held under initial compression by the retainer bolt H anchored to the projections 19 of the front and rear followers A and extending through the inner coils of the spring resistance G and alined openings in the front and rear spring followers F and the front and rear wedge blocks C.

The operation of my improved shock absorbing mechanism is as follows, assuming an inward or buffing movement of the drawbar. Upon inward or rearward movement of the draw-bar, the front follower A will move therewith, forcing the front wedge C and the shoes rearwardly therewith and compressing the spring resistance G, thereby forcing the rear pair of shoes D against the rear wedge C. At the same time, a wedging action will be set up between the front and rear wedges and the shoes D, placing the friction plates under lateral pressure. As the rearward movement of the front follower A continues, the front shoes D will tend to move the friction plates and front casing B rearwardly therewith, due to the friction between the front shoes D and the innermost plates of each group. At the same time there will be an equal resistance to the rearward movement of the plates and the rear casing B due to the friction between the rear shoes D and the innermost plates of each group. Due to this balancing action, the rear casing B and the rear ends of the plates will approach the rear follower A at substantially the same rate as the front follower approaches the front casing B and the front ends of the plates, while the front shoes slip on the inner plates 33 and the plates slip on the rear shoes D. This action will continue until the front follower engages with the front casing B and the front ends of the plates 32 and the rear casing B and the rear ends of the plates 33 engage the rear follower A, whereupon the front casing B and plates 32 will be moved rearwardly directly by the front follower, while the rear casing and the plates 33 will be held stationary by contact with the rear follower, thereby causing movement of the plates 32 relatively to the plates 33 opposed by the frictional resistance between the coacting surfaces of the plates and the outermost plates 32 and the friction surfaces of the rear casing B. As will be evident, during the relative movement of the casings B and the shoes D, the shoulders 31 of the latter will be moved away from the ribs 24 of the casings B, thus spacing the shoulders inwardly of the ribs an appreciable distance.

The relative movement of the followers, casing and plates continues until the actuating force is removed or until the adjacent ends of the casings B come into abutting relation, whereupon the force is transmitted directly through the casings to the rear stop lugs.

During draft the action is the reverse of that just described, the rear follower being moved forwardly while the front follower is held stationary.

Upon removal of the actuating force, the wedge pressure will be relieved and there will be an initial release movement of the friction shoes D and wedges C due to the shoulders 31 of the shoes being spaced from the ribs 24 on the casings, as hereinbefore described, the only resistance which must therefore be over-come being the friction created between the shoes and the innermost plates of each group. This initial action assures an easy release and a quick and certain reduction of the lateral pressure on the groups of plates. As the shoes at one end of the mechanism move outwardly relatively to the casing B, due to the expansion of the spring resistance, the shoulders on said shoes 31 will engage the ribs of the casing and carry the same and the friction plates anchored thereto outwardly also. Upon outward movement of the shoes at one end of the mechanism, the spring resistance is permitted to expand, thereby relieving the pressure on the shoes at the other end of the mechanism, and reducing the pressure on the plates. As one set of plates moves outwardly with the casing to which the same are anchored, the other set of plates and the casing anchored thereto, due to the friction between the sets of plates, will be carried along therewith until arrested by the ribs 24 engaging the shoulders 31 of the corresponding shoes D. All of the parts will thus be restored to normal position by the expansion of the spring resistance.

It will be evident that proper spacing of the front ends of the plates 32 and the front casing B with reference to the front follower and the rear ends of the plates 33 and the rear casing B with reference to the rear follower, in the normal position of the parts, will be maintained by the shoulders 31 on the shoes engaging the ribs 24 of the casings B when the shoes are in their outermost position.

As wear occurs on the various friction and wedge surfaces, compensation therefor will be had by the wedge shoes D being moved apart due to the expansion of the spring resistance G, which is under initial compression as hereinbefore described.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with front and rear followers, relatively movable toward each other; of front and rear friction casings relatively movable toward each other upon movement of said followers; lateral wedge-pressure-creating means including friction shoes having means thereon adapted to co-act with said casings to restore the same to normal position, said shoes being relatively movable with reference to the casings during compression of the mechanism; longitudinally arranged friction plates within the said casings adapted for relative movement upon relative movement of said casings, said plates being divided into two groups on opposite sides of said wedge pressure creating means, certain of said plates of each group being anchored to the front casing and the remaining plates of each group being anchored to the rear casing; and a spring resistance co-acting with said shoes.

2. In a friction shock absorbing mechanism, the combination with front and rear followers; of front and rear follower casings, normally slightly spaced from the front and rear followers respectively and adapted to be moved relatively to each other by direct engagement of the followers therewith upon relative movement of the latter; a plurality of longitudinally disposed friction plates, said plates being arranged in two groups at opposite sides of the mechanism, alternate plates of each group being anchored to the front and rear casings respectively; front and rear, wedge-pressure-transmitting members co-acting with the front and rear followers; friction shoes interposed between each wedge member and the group of friction plates, said shoes being movable relatively to the casings upon compression of the mechanism; means on said shoes adapted to engage the casings to restore the same to normal position; and a spring resistance co-acting with said shoes.

3. In a friction shock absorbing mechanism, the combination with front and rear followers; of front and rear wedges co-acting with said followers; front and rear pairs of friction shoes engaging said wedges, each of said shoes having a shoulder thereon; a spring resistance interposed between said front and rear shoes; longitudinally arranged friction plates adapted for relative movement, said plates being divided into two groups at opposite sides of said shoes; front and rear friction casings, each having ribs by which the same are anchored to alternate plates of each of said groups, said ribs being engaged by the shoulders on said shoes during release of the mechanism to restore the plates and casings to normal position.

4. In a friction shock absorbing mechanism, the combination with front and rear casings, normally spaced apart and movable toward each other; of front and rear followers co-acting with the respective casings to move the latter toward each other, said followers being normally slidably spaced from the casings; front and rear wedges movable with said followers respectively; front and rear pairs of wedge shoes directly engaged by said wedges, said shoes and casings having interengaging means thereon for restoring the casing to normal position in spaced relation to said followers, said shoes being movable with the wedges relatively to said casings during the approach of said followers and casings to space apart said interengaging means; a plurality of friction plates anchored to each casing for movement therewith to restore the plates to normal position, the plates anchored to one casing being intercalated with those anchored to the other casing; and a spring resistance interposed between said front and rear pairs of shoes.

5. In a friction shock absorbing mechanism, the combination with front and rear followers relatively movable toward each other; of front and rear friction casings relatively movable toward each other, normally spaced from the respective followers and adapted to abut and act as stop columns when the mechanism is fully compressed to transmit the actuating force directly to the draft sills; lateral wedge pressure creating means including wedge shoes having means thereon adapted to co-act with said casings to restore the same to normal position, said shoes being relatively movable with reference to the casings during compression of the mechanism; longitudinally arranged friction plates within said casings adapted for relative movement upon relative movement of said casings, said plates being divided into two groups on opposite sides of said wedge pressure-creating-means, certain of said plates of each group being connected to the front casing and the remaining plates being connected to the rear casing; and a spring resistance co-acting with said shoes.

6. In a friction shock absorbing mechanism, the combination with front and rear followers; of oppositely arranged front and rear casings normally spaced apart, and each slightly spaced with reference to the respective follower, said casings being adapted for relative movement; front and rear wedge blocks movable with said followers; front and rear wedge shoes engaged by said blocks and adapted for limited movement relatively to said casings; a spring resistance; longitudinally arranged friction plates adapted for relative movement upon relative movement of said casings, said plates being divided into two groups on opposite sides of said wedge blocks and shoes, each group comprising two sets of plates; means on each of said casings adapted to engage each plate of one set near one end thereof for restoring said set to normal position with the corresponding ends thereof slightly spaced from the adjacent follower; and co-acting means on said shoes and casing adapted to restore the casings to normal position with the outer ends thereof slightly spaced from the front and rear followers, respectively.

7. In a friction shock absorbing mechanism, the combination with front and rear followers having wedge means movable therewith; of oppositely arranged, front and rear, friction shells movable with said followers; a plurality of friction wedge shoes co-acting with said wedge means; a plurality of friction plates within said shells, said plates being divided into two groups on opposite sides of said shoes, each of said groups comprising relatively movable sets of plates, one set of each group having means thereon co-acting with one of said shells to effect return of the plates to normal position and the other set having means thereon co-acting with the remaining shell to effect return of the same to normal position; inter-engaging means on said shoes and shells for restoring said shells to normal position; and a spring resistance.

In witness that I claim the foregoing I have hereunto subscribed my name this 22nd day of June, 1923.

JOHN F. O'CONNOR.